Dec. 8, 1936.  C. W. WEISE  2,063,136
NUT PICK
Filed Jan. 29, 1934
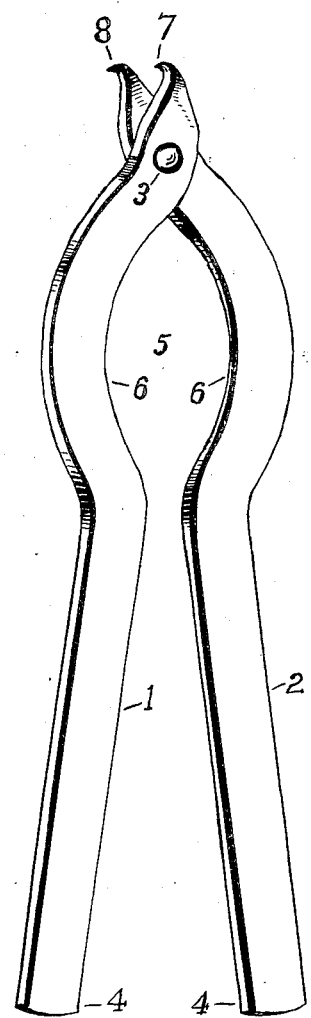
INVENTOR:
C. W. Weise.

Patented Dec. 8, 1936

2,063,136

UNITED STATES PATENT OFFICE 2,063,136

NUT-PICK

C. W. Weise, Giddings, Tex.

Application January 29, 1934, Serial No. 708,922

1 Claim. (Cl. 146—13)

The invention is a new and practical hand nut sheller or picker, especially well suited for shelling pecans.

The figure in the drawing is a general view of the nut-pick.

The sheller consists of two similar shaped metal bars or levers, numbers one (1) and two (2) in the illustration, riveted together at number three (3) about three-fourths of an inch from the upper ends, opposite of the handle, the handle ends being specified by number four (4). The size and shape may vary to some extent.

The rivet acts as a pivot and offers no play between the levers. At about three-fourths of the length from the handle or lower ends, and just below the rivet, the levers are bent outward to form an oval shaped space between them, at number five (5). The inside edges of this oval shaped bend are bluntly beveled, scissor-like at number six (6). The upper ends of the levers, beyond the rivet, are specially shaped nibs or picks, numbers seven (7) and eight (8).

The operation of the sheller or picker is simple; the pecan is placed length-wise between the beveled edges, number six (6), in such a way that said edges come in contact with the pecan at a point between the kernel halves, and a quick pressure upon the levers cracks or splits the pecan in halves. After properly cracking the shell with jaws (6) the portions of the shell surrounding the kernel are cracked away from the same by holding the nut to one side of a nib, inserting the point of the nib (7) over an edge of the shell between the kernel and the shell and twisting the levers longitudinally to break away the portion of the shell. Then the shell on each half is broken or chipped off with the picks, numbers seven (7) and eight (8), until the kernel can be removed. The nuts are easily and quickly shelled in this way without breaking the kernels.

This cracker does not exactly cut the pecans in halves but rather presses the halves in opposite directions by the impact which is greatest at the near center of the nut.

I am aware that similar previous inventions in nut shellers have had the principle of cutting the pecans in half, but my invention being different in having blunt splitting edges instead of sharp ones; also that the cutting edges do not operate against each other like in similar nut shellers, but, as are the complete levers, are fastened and operate one beside the other, which permits the opening and closing of the cutting edges to any desired degree and thereby facilitates in cracking large and small nuts. Also that the cutting edges are below the rivet, towards the handle ends which, I believe, permits the easier and speedier use of the tool. One of the pointed picks may be used to remove small particles of shell from the grooves of the nut kernels.

Therefore, I claim:

A nut pick comprising a pair of relatively thin flat elongated lever members, means pivotally connecting the levers, one on top of the other, adjacent one end, the opposite ends of the levers constituting handles, arcuate portions on said levers between the handles and the pivot means, the concaves formed by the arcuate portions facing each other and beveled to provide nut cracking jaws, the ends of said levers on the opposite side of the pivot means from the jaws being formed into flat, parallel, pointed, hook shaped nibs lying in the same planes as their respective levers, the open side of the hook shaped nibs both facing the same direction and being displaced from each other when the levers are in closed position, said hook-shaped nibs forming nut picks capable of independent use by inserting a point between a portion of broken shell and a kernel and twisting the levers about an axis longitudinal with respect thereto.

C. WM. WEISE.